(12) United States Patent
Hirata et al.

(10) Patent No.: US 8,811,127 B1
(45) Date of Patent: Aug. 19, 2014

(54) MAGNETIC HEAD COMPRISING RECORDING PART, READING PART, HEATER FOR EXPANSION OF THE RECORDING PART, AND HEATER FOR EXPANSION OF THE READING PART

(71) Applicants: TDK Corporation, Tokyo (JP); SAE Magnetics (H.K.) Ltd., Hong Kong (CN)

(72) Inventors: Kei Hirata, Tokyo (JP); Koji Shimazawa, Tokyo (JP); Yasutoshi Fujita, Hong Kong (CN); Ryuji Fujii, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/773,708

(22) Filed: Feb. 22, 2013

(51) Int. Cl.
  *G11B 11/00* (2006.01)
  *G11B 13/04* (2006.01)
(52) U.S. Cl.
  CPC ..................... *G11B 13/04* (2013.01)
  USPC .................. 369/13.33; 369/13.13
(58) Field of Classification Search
  CPC .............................................. G11B 2005/0021
  USPC ....................... 369/13.13, 13.33, 13.32, 13.17
  See application file for complete search history.

(56) References Cited

U.S. PATENT DOCUMENTS

| | | | |
|---|---|---|---|
| 8,164,987 B2 * | 4/2012 | Gill et al. .................... | 369/13.14 |
| 8,351,157 B2 * | 1/2013 | Nishioka et al. .......... | 360/125.31 |
| 2003/0099054 A1 * | 5/2003 | Kamijima ...................... | 360/59 |
| 2004/0027709 A1 * | 2/2004 | Hamaguchi et al. ............ | 360/59 |
| 2004/0070870 A1 * | 4/2004 | Hsiao et al. .................. | 360/126 |
| 2007/0247758 A1 * | 10/2007 | Kurita et al. ............... | 360/234.7 |
| 2008/0094755 A1 * | 4/2008 | Ota et al. ................... | 369/13.33 |
| 2009/0073597 A1 * | 3/2009 | Shiramatsu et al. ............ | 360/59 |
| 2009/0251828 A1 * | 10/2009 | Schreck et al. ................ | 360/319 |
| 2009/0310243 A1 * | 12/2009 | Aoki ............................... | 360/59 |
| 2012/0008230 A1 * | 1/2012 | Nishioka et al. ................ | 360/59 |
| 2013/0279045 A1 * | 10/2013 | Agari et al. ................ | 360/125.3 |
| 2013/0286807 A1 * | 10/2013 | Gao et al. ................... | 369/13.33 |

FOREIGN PATENT DOCUMENTS

| | | | |
|---|---|---|---|
| JP | 2005-116155 A | | 4/2005 |
| JP | 2006-351115 A | | 12/2006 |

* cited by examiner

*Primary Examiner* — Tan X Dinh
(74) *Attorney, Agent, or Firm* — Posz Law Group, PLC

(57) ABSTRACT

A magnetic head includes a reading part, a recording part that is laminated on the reading part in a planer view, a recording part expansion heater, a reading part expansion heater, and a thermal expansion promoting layer that is prepared at a position closer to the reading part than to the recording part and extends to an air bearing surface.

11 Claims, 10 Drawing Sheets

MAGNETIC HEAD COMPRISING RECORDING PART, READING PART, HEATER FOR EXPANSION OF THE RECORDING PART, AND HEATER FOR EXPANSION OF THE READING PART

BACKGROUND OF THE INVENTION

1. Field of the Invention

The present invention relates to a magnetic head including a recording part that performs recording of information to a magnetic recording medium, a reading part that performs reading of information, a recording part expansion heater, and a reading part expansion heater.

2. Description of the Related Art

In the field of magnetic recording using a magnetic head and a magnetic recording medium, along with the advancement of high recording density of a magnetic disk apparatus, further improvement in the performance of the magnetic head and the magnetic recording medium is demanded. As the magnetic head, a composite-type thin film magnetic head is widely used having a structure in which a reading part that includes a magnetoresistive (MR) element for reading and a recording part that includes an induction-type electromagnetic transducer element (magnetic recording element) for writing are laminated on a substrate. In the magnetic disk apparatus, the magnetic head is provided in a slider that flies slightly above a surface of the magnetic recording medium. The reading part and the recording part are prepared in a manner to be exposed on an air bearing surface (ABS) of the magnetic head that opposes the magnetic recording medium.

It is preferable that a distance between the magnetic recording medium and the recording part when recording information by using such a magnetic head and a distance between the magnetic recording medium and the reading part when reading information are respectively small and highly accurate. Therefore, for example, a configuration is disclosed in JP2006-351115A in which resistive heating bodies are respectively prepared in the vicinity of a recording part and the vicinity of a reading part, and, by using the two resistive heating bodies that are driven independently of one another, it is possible to respectively bring the recording part, when recording, and the reading part, when reading, close to the magnetic recording medium. According to this configuration, by respectively adjusting driving powers supplied to the resistive heating bodies, the distance between the recording part and the magnetic recording medium, when recording, and the distance between the reading part and the magnetic recording medium, when reading, can be finely adjusted.

On the other hand, in a magnetic recording device, along with the advancement of high density in magnetic recording, so-called thermally-assisted magnetic recording is proposed in which a magnetic material with large magnetic anisotropy energy Ku is used as a recording medium and a magnetic field is applied to perform writing after a coercive force is reduced by applying heat to the magnetic recording medium. In the thermally-assisted magnetic recording, a method in which laser light is used in order to apply heat to the magnetic recording medium is common. Among such methods, a method (near-field light heating) is proposed in which the laser light is converted to near-field light and the magnetic recording medium is heated by irradiating the magnetic recording medium with the near-field light. The near-field light is a kind of electromagnetic field that is formed around a substance and has a property that a diffraction limit due to the wavelength of the light can be ignored. By irradiating a microstructure body with light having aligned wavelengths, near-field light that depends on the scale of the microstructure body is generated and focusing of the light to a minimum region of about several tens of nm is possible.

As a specific means to perform thermally-assisted magnetic recording using near-field light, a thermally-assisted magnetic recording head using surface plasmons is proposed in JP2005-116155A. In this thermally-assisted magnetic recording head, instead of being directly radiated to a plasmon antenna, propagation light that propagates through a waveguide couples with a plasmon generator in a surface plasmon mode via a cladding layer. The light propagating through the waveguide is totally reflected at an interface between the waveguide and the cladding layer. In this case, light that is referred to as evanescent light and exudes to the cladding layer is generated. The evanescent light and collective oscillations of electric charges in the plasmon generator are coupled and surface plasmons are excited in the plasmon generator. The excited surface plasmons propagate to a near-field light generation end surface that is an ABS side end part of the plasmon generator, and near-field light is generated at the near-field light generation end surface. When the magnetic recording medium is irradiated with the near-field light, temperature in the recording part itself that performs the thermally-assisted magnetic recording (in particular, in the plasmon generator on which light is focused) also is likely to rise. That is, it is possible that not only heat generation of a recording part expansion heater and a reading part expansion heater, but also the irradiation of the near-field light can cause temperature rise and thermal expansion in the magnetic head that performs the thermally-assisted magnetic recording.

In order to minimize capacity loss of the magnetic recording medium (HDD), it is desirable that the reading part and the recording part be arranged close to each other at the ABS of the magnetic head. However, when the reading part and the recording part are close to each other, there is a possibility that, when the resistive heating body in the vicinity of the reading part is driven during reading, temperature rise and expansion also occur in the recording part. In this case, the recording part that is generally positioned on a trailing side becomes in contact with the magnetic recording medium before the reading part does, and thus the reading part is prevented from becoming further closer to the magnetic recording medium. Therefore, there is a possibility that it is difficult to have a desired distance between the reading part and the magnetic recording medium. It is not preferable to increase the distance between the recording part and the reading part at the ABS in order to prevent that temperature rise also occurs in the recording part when the reading part is heated, because the capacity loss in the HDD will increase.

In particular, in order to perform accurate reading of information, it is important that the distance between the reading part and the magnetic recording medium be accurately set smaller. Usually, when setting a flying height of a slider (distance between the slider and the magnetic recording medium), at least once the ABS is brought into contact with the magnetic recording medium (or its substitute) and then the flying height from the magnetic recording medium, that is, the distance between the ABS and the magnetic recording medium, is adjusted. Therefore, in order to adjust the distance between the reading part and the magnetic recording medium, the reading part has to be brought into contact with the magnetic recording medium. Suppose that the recording part or its vicinity is brought into contact with the magnetic recording medium before the reading part is brought into contact with the magnetic recording medium, the reading part cannot be brought into contact with the magnetic recording medium, and the flying height from the magnetic recording medium has to be set based on the position where the recording part or its vicinity and the magnetic recording medium are in contact with each other. Therefore, the distance between the reading part and the magnetic recording medium cannot be accurately set.

SUMMARY OF THE INVENTION

A purpose of the present invention is to provide a magnetic head that includes a recording part, a reading part, a recording part expansion heater and a reading part expansion heater, in which the recording part and the reading part are arranged close to each other to contribute to suppression of recording capacity reduction of a magnetic recording medium and to allow suppression of influence of heat on the recording part during heating in order to expand the reading part.

In order to achieve the purpose, a magnetic head of the present invention includes a reading part that is prepared upper than a substrate in a lamination direction and has a reading element that performs reading of information recorded in a magnetic recording medium; a recording part that is prepared upper than the substrate in the lamination direction and performs magnetic recording to the magnetic recording medium; a recording part expansion heater that is positioned in a vicinity of the recording part; a reading part expansion heater that is positioned in a vicinity of the reading part; and a thermal expansion promoting layer that is prepared at a position closer to the reading part than to the recording part and extends to an air bearing surface that opposes the magnetic recording medium. The recording part may be prepared upper than the reading part in the lamination direction, and the thermal expansion promoting layer may be positioned between the substrate and the reading part.

The recording part expansion heater and the reading part expansion heater may be driven independently of one another.

The reading part may include the reading element, and an upper shield layer and a lower shield layer that are arranged in a manner sandwiching the reading element. In such a case, a distance between the lower shield layer and the thermal expansion promoting layer may be 0.5-1.0 μm. The reading part expansion heater is positioned between the lower shield layer of the reading part and the thermal expansion promoting layer.

The recording part may include a waveguide that propagates incident light toward the air bearing surface; a main magnetic pole of which one end part is positioned on the air bearing surface; and a plasmon generator that is positioned between the waveguide and the main magnetic pole, that is prepared along the waveguide in a manner opposing the waveguide, and of which one end part is positioned on the air bearing surface, and the recording part may be a thermally-assisted magnetic recording part that performs magnetic recording to the magnetic recording medium while heating the magnetic recording medium by irradiating the magnetic recording medium with light.

A protective layer may be included covering the air bearing surface, wherein a portion of the protective layer that covers the recording part may have a thickness larger than a thickness of a portion of the protective layer that covers the reading part. A difference between the thickness of the portion of the protective layer that covers the recording part and the thickness of the portion of the protective layer that covers the reading part is preferably 2 nm or less. The portion of the protective layer that covers the recording part may have a multilayer structure, and the portion of the protective layer that covers the reading part may have a single layer structure.

A ratio of a protrusion magnitude that the reading part thermally expands and protrudes in a direction orthogonal to the air bearing surface due to heat during driving of the reading part expansion heater to a protrusion magnitude that the recording part thermally expands and protrudes in the direction orthogonal to the air bearing surface due to heat during driving of the recording part expansion heater is preferably 1.5 or more.

A distance between the reading part and the recording part on the air bearing surface is preferably 7 μm or less.

The above-described purpose, features and advantages and other purposes, features and advantages of the present invention will be clear by reading the following explanation with reference to the accompanying drawings that illustrate embodiments of the present invention.

DESCRIPTION OF THE PREFERRED EMBODIMENTS

A magnetic head of the present invention is explained with reference to the drawings.

Figure 1:
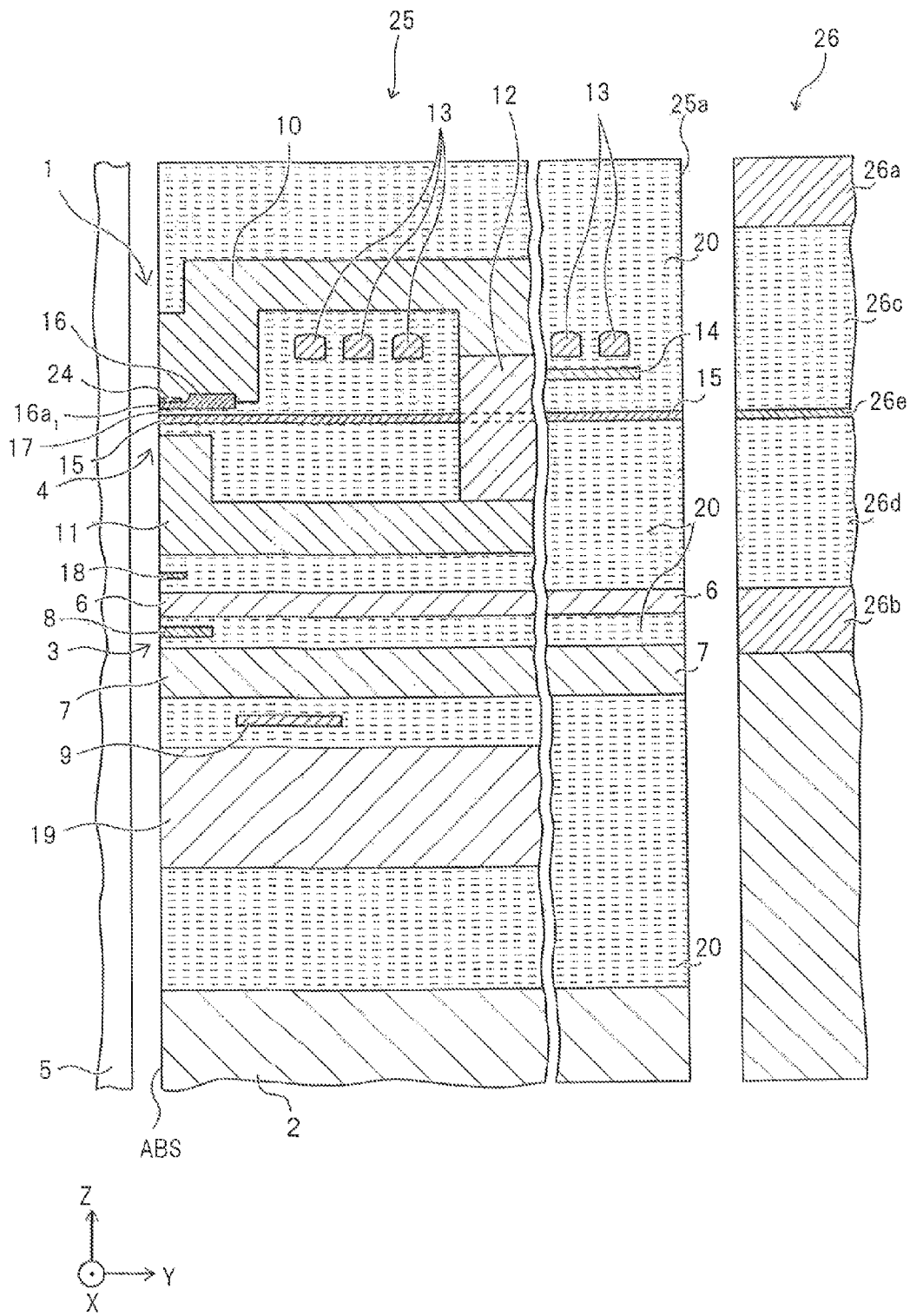
FIG. 1 is a cross-sectional view of a slider containing a magnetic head according to a first embodiment of the present invention.
Figure 2:
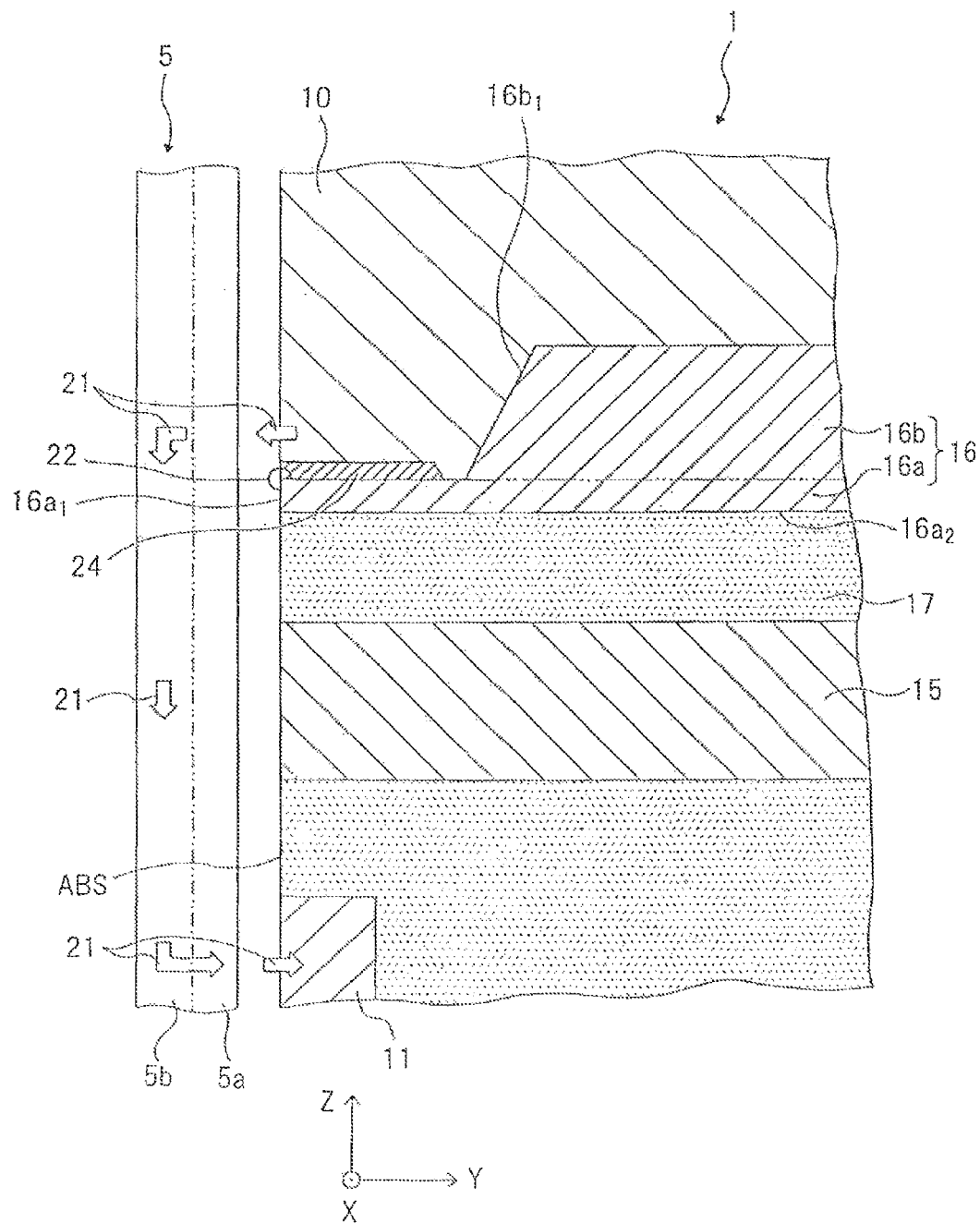
FIG. 2 is a cross-sectional view illustrating a recording part of the magnetic head illustrated in FIG. 1.

Referring to FIGS. 1 and 2, a basic configuration of a magnetic head 1 of the present invention is explained. The magnetic head 1 has a reading part 3 positioned upper than a substrate 2 that is formed of ALTIC ($Al_2O_3$—TiC) in a lamination direction and a recording part 4 positioned upper than the reading part 3 in the lamination direction. The reading part 3 and the recording part 4 are exposed on an ABS that opposes a magnetic recording medium 5. In the present specification, a width direction of the ABS of the magnetic head 1 represents an "X-direction;" a direction that is a height direction of the ABS and a film formation direction in a manufacturing process (to be described later) and orthogonal to a film surface represents a "Z-direction" or a "lamination direction" or a "down track direction;" and a depth direction orthogonal to the ABS represents a "Y-direction," the ABS opposing the magnetic recording medium 5. An "upward lamination direction" means a direction oriented from the substrate 2 toward the recording part 4, and a "downward lamination direction" means a direction oriented from the recording part 4 toward the substrate 2.

The reading part 3 of the present embodiment is sandwiched between a metallic upper shield layer 6 and a lower shield layer 7, and has an MR element (reading element) 8 of which electrical resistance changes in response to a change in magnetic flux density. The MR element 8 may have an arbitrary configuration that uses a magnetoresistive effect, such as a CIP (Current In Plane)-GMR (Gigantic Magneto Resistive) element in which a sense current flows in a direction parallel to a film surface, a CPP (Current Perpendicular to Plane)-GMR element in which a sense current flows in the Z-direction (the lamination direction) perpendicular to a film surface, and a TMR (Tunneling Magneto Resistive) element that uses a tunnel effect. When the MR element 8 is a CPP-GMR element or a TMR element, the upper shield layer 6 and the lower shield layer 7 are also used as electrodes supplying the sense current. On a lower side of the lower shield layer 7 of the reading part 3 in the lamination direction, a reading part expansion heater 9 that is formed of a resistive heating body is prepared.

The recording part 4 that is positioned upper than the reading part 3 in the lamination direction is a thermally-assisted magnetic recording part for so-called perpendicular magnetic recording. One end part of the recording part 4 is exposed on the ABS and has a main magnetic pole (yoke) 10 that opposes the magnetic recording medium 5. The main magnetic pole 10 is formed with an alloy that is formed of any two or three of Ni, Fe and Co. On a lower side of the main magnetic pole 10 in the lamination direction, a leading shield layer (return yoke) 11 is prepared. The leading shield layer 11 is formed with an alloy that is formed of any two or three of Ni, Fe and Co. The main magnetic pole 10 and the leading shield layer 11 are magnetically coupled to each other by a contact part (backgap) 12. In the present embodiment, the leading shield layer 11 is prepared lower than the main magnetic pole 10 in the lamination direction. However, the leading shield layer 11 can also be prepared upper than the main magnetic pole 10 in the lamination direction. Between the main magnetic pole 10 and the leading shield layer 11, a coil 13 is wound around a contact part 12. Magnetic flux can be generated by applying a current from outside to the coil 13. The coil 13 is formed from a conductive material such as Cu, and the number of turns of the coil 13 is not limited.

Further, the recording part 4 includes a waveguide (core) 15 onto which laser light for heating the magnetic recording medium 5 is incident. The waveguide 15 can be formed, for example, with $TaO_x$. $TaO_x$ means tantalum oxide of any composition. Typical examples of $TaO_x$ include $Ta_2O_5$, TaO, $TaO_2$, and the like. However, $TaO_x$ is not limited to these typical ones. A plasmon generator 16 is prepared in a manner opposing a part of the waveguide 15. The plasmon generator 16 is formed from Au, Ag, Cu, Al, Pd, Ru, Pt, Rh, Ir or an alloy having these metals as a main component, and extends to the ABS in the Y-direction. The plasmon generator 16 has a near-field light generation end surface $16a_1$. The near-field light generation end surface $16a_1$ is exposed on the ABS and opposes the magnetic recording medium 5. A cladding layer 17 is prepared lower than the plasmon generator 16 in the lamination direction and between the plasmon generator 16 and the waveguide 15. The cladding layer 17 can be formed, for example, with $AlO_x$. Here, $AlO_x$ means aluminum oxide of any composition. A typical example of $AlO_x$ is $Al_2O_3$. However, $AlO_x$ is not limited to this typical one.

In the vicinity of the contact part 12 of the recording part 4, a recording part expansion heater 14 that is formed of a resistive heating body is prepared. The reading part expansion heater 9 and the recording part expansion heater 14 can be driven independently of one another.

Between the reading part 3 and the recording part 4, a Head-Disc Interface (HDI) sensor 18 is arranged. The HDI sensor 18 mainly detects contact between the ABS of the magnetic head 1 and the magnetic recording medium 5.

A metallic thermal expansion promoting layer 19 that is a main feature of the present invention is prepared lower than the reading part 3 in the lamination direction, that is, between the lower shield layer 7 and the substrate 2. The thermal expansion promoting layer 19 extends to the ABS and is exposed on the ABS.

Portions other than the above-described members are filled with insulating nonmagnetic material 20 such as $AlO_x$. Among those portions, a layer positioned upper than the main magnetic pole 10 of the recording part 4 in the lamination direction may be referred to as an overcoat layer and a layer positioned lower than the metallic thermal expansion promoting layer 19 in the lamination direction may be referred to an undercoat layer. The material may be the same as that of the cladding layer 17.

In the recording part 4 of the magnetic head 1 of the present embodiment, propagation light that is incident onto and propagates through the waveguide 15 couples with the plasmon generator 16 in a surface plasmon mode via the cladding layer 17 and surface plasmons are excited in the plasmon generator 16. The excited surface plasmons propagate along the plasmon generator 16 to the near-field light generation end surface $16a_1$ and near-field light is generated at the near-field light generation end surface $16a_1$. In FIG. 2, a region 22 where the near-field light is generated is schematically illustrated. In this way, by irradiating the magnetic recording medium with the near-field light, the magnetic recording medium 5 is partially heated and the coercive force is reduced.

Magnetic flux 21 is generated when a current is passed to the coil 13 of the recording part 4. As illustrated in FIG. 2, the magnetic flux 21 is emitted from a front end portion of the main magnetic pole 10 toward the magnetic recording medium 5, travels along a perpendicular direction (Y-direction) through a recording layer 5a that is a surface layer of the magnetic recording medium 5 for perpendicular magnetic recording, and magnetizes each recording bit of the recording layer 5a along the perpendicular direction. After passing through the recording layer 5a and in a under layer 5b that is below the recording layer 5a and that is made of a soft magnetic material, the magnetic flux 21 changes magnetic path to a surface direction (Z-direction) of the magnetic recording medium 5. The magnetic flux 21 further changes orientation again to the perpendicular direction (Y-direction) in the vicinity of the leading shield layer 11 and is absorbed by the leading shield layer 11. That is, the magnetic flux 21 is controlled by the leading shield layer 11, and perpendicularly passes through the recording layer 5a to form a U-shape magnetic path. The main magnetic pole 10 is close to the near-field light generation end surface 16$a_1$ of the plasmon generator 16, and a front end of the main magnetic pole 10 opposes an irradiation position of the near-field light from the near-field light generation end surface 16$a_1$. Therefore, by applying a magnetic field from the main magnetic pole 10 to the portion of the magnetic recording medium 5 where the coercive force is reduced by the heating by the near-field light, thermally-assisted magnetic recording to the magnetic recording medium 5 is performed.

On the other hand, the MR element 8 that is sandwiched by the upper shield layer 6 and the lower shield layer 7 sequentially detects a magnetization direction of each of the recording bits of the magnetic recording medium 5 that is close; thereby, the reading part 3 of the magnetic head 1 reads out magnetic information recorded in the magnetic recording medium 5.

When recording, the recording part expansion heater 14 is driven to generate heat to thermally expand the recording part 4 and the nonmagnetic material 20 positioned in the vicinity of the recording part 4; thereby, a front end of the recording part 4 (the near-field light generation end surface 16$a_1$ and front ends of the main magnetic pole 10) is brought close to the magnetic recording medium 5. When reading, the reading part expansion heater 9 is driven to generate heat to thermally expand the reading part 3 and the nonmagnetic and insulating material 20 positioned in the vicinity of the reading part 3; thereby, the front end of the reading part 3 (MR element 8) is brought close to the magnetic recording medium 5.

When recording, by increasing the intensity of the laser light incident onto the waveguide 15 for irradiating the magnetic recording medium 5 with the near-field light and increasing the power supplied to the coil 13 for applying the magnetic field from the main magnetic pole 10 to the magnetic recording medium 5, even when the distance between the recording part 4 and the magnetic recording medium 5 is large, the recording can be satisfactorily performed to some extent. However, when reading, in order to reliably read out the magnetization direction of each recording bit of the magnetic recording medium 5, it is preferable that the reading part 3 and the magnetic recording medium 5 are as close to each other as possible. When the distance between the reading part 3 and the magnetic recording medium 5 is large, reading information by the reading part 3 is difficult. That is, in the magnetic head 1, as compared to the distance between the recording part 4 and the magnetic recording medium 5 during recording, the distance between the reading part 3 and the magnetic recording medium 5 during reading is very important.

Therefore, in the present invention, between the reading part 3 and the substrate 2, more specifically, between the reading part expansion heater 9 that is positioned lower than the lower shield layer 7 in the lamination direction and the substrate 2, the metallic thermal expansion promoting layer 19 is prepared. Thereby, the heat generated by driving the reading part expansion heater 9 is absorbed by the metallic thermal expansion promoting layer 19 before escaping to the substrate 2 on the outside of the reading part 3. Therefore, heat transferred to the reading part 3 and its vicinity increases. That is, according to the present embodiment, the reading part 3 is efficiently heated and thermally expanded. Regarding thermal expansion in the depth direction (Y-direction), a DFH gamma ratio ((protrusion length of the reading part)/(protrusion length of the recording part)) that is a ratio of a protrusion magnitude (amount of thermal expansion) in the Y-direction of the reading part 3 when the reading part expansion heater 9 is driven to a protrusion magnitude (amount of thermal expansion) in the Y-direction of the recording part 4 when the recording part expansion heater 14 is driven under the same condition is 1.5 or more.

In this way, by letting the reading part 3 adopt a configuration that facilitates thermal expansion (that allows the reading part 3 to be easily brought close to the magnetic recording medium 5), for example, it is prevented that the recording part 4 becomes in contact with the magnetic recording medium 5 before the reading part 3 becomes in contact with the magnetic recording medium 5 so that the reading part 3 cannot become further closer to the magnetic recording medium 5. Therefore, the distance between the reading part 3 and the magnetic recording medium 5 can be reduced, and thus, reading performance can be maintained. Further, when setting the flying height of the magnetic head 1 from the magnetic recording medium 5 during reading, it is not based on a state in which the recording part 4, not the reading part 3, is in contact with the magnetic recording medium 5 (or its substitute); instead, it can be based on a state in which the reading part 3 itself is in contact with the magnetic recording medium 5. Therefore, the setting of the flying height can be accurately performed, and a desired reading performance can be obtained.

It is preferable that the distance between the lower shield layer 7 and the thermal expansion promoting layer 19 in the lamination direction (Z-direction) be 0.5-1.0 μm. This is because when this distance is less than 0.5 μm, there is a possibility that poor insulation may occur between the lower shield layer 7 and the thermal expansion promoting layer 19; and when this distance is larger than 1.0 μm, there is a possibility that the heat generated by driving the reading part expansion heater 9 is not well absorbed by the lower shield layer 7 and the thermal expansion promoting layer 19 so that a sufficient amount of thermal expansion of the reading part 3 is not obtained and the DFH gamma ratio decreases.

Next, details of the magnetic head 1 of the present embodiment are explained in more detail. However, the following explanation is only exemplary. The present invention is not limited to the configuration described below.

The reading part 3 of the magnetic head 1 of the present invention adopts a configuration in which the MR element 8 is arranged between the upper shield layer 6 and the lower shield layer 7. Although not illustrated in the drawings, the MR element 8 mainly has a free layer in which the magnetization direction changes in response to an external magnetic field, a nonmagnetic intermediate layer, and a pinned layer in which the magnetization direction does not change in response to the external magnetic field. The free layer and the pinned layer are formed of CoFe, NiFe, CoFeB, and the like, and the nonmagnetic intermediate layer is formed of ZnO, MgO, $Al_2O_3$, AlN, $TiO_2$, NiO, and the like. When the nonmagnetic intermediate layer is formed of a metal or a semiconductor such as ZnO, the MR element 8 functions as a CPP (Current Perpendicular to the Plane)-GMR (Giant Magneto-Resistance) element; and when the nonmagnetic intermediate layer is formed of an insulator such as MgO, the MR element 8 functions as a TMR (Tunneling Magneto-Resistance) element.

As described above, the recording part 4 of the magnetic head 1 of the present invention may perform the thermally-assisted magnetic recording using the near-field light. In this case, in addition to the main magnetic pole (yoke) 10, the return shield layer 11, the contact part (backgap) 12 and the coil 13, the recording part 4 has the waveguide (core) 15, the plasmon generator 16 and the cladding layer 17.

Further, a structure body (heat sink) having a heat dissipation effect may be provided in the plasmon generator 16. That is, as illustrated in FIG. 2, the plasmon generator 16 includes a first configuration member 16a and a second configuration member 16b, the second configuration member 16b being integrally prepared on top of the first configuration member 16a and functioning as a heat sink. The first configuration member 16a includes the near-field light generation end surface $16a_1$ and a surface plasmon mode coupling part $16a_2$ that couples in a surface plasmon mode with the propagation light propagating through the waveguide 15, and extends to the ABS. The second configuration member 16b is formed of a material same as that of the first configuration member 16a and is integrally joined to the top of the first configuration member 16a. An ABS side end part of the second configuration member 16b, without reaching the ABS, terminates at a slope $16b_1$ at a position recessed from the ABS. It is also possible to have a configuration in which the second configuration member 16b is formed of a material different from that of the first configuration member 16a and at least a portion of the second configuration member 16b is in contact with the first configuration member 16a. A separator layer 24 that is formed of a material (for example, aluminum oxide) that does not absorb much of the near-field light is interposed between the first configuration member 16a and the main magnetic pole 10. The separator layer 24 is formed of oxide or nitride (such as alumina, silica and MgO) or a lamination film of the oxide or nitride, the oxide or nitride having transparency to the light (laser light) that propagates through the waveguide 15.

As described above, the magnetic head 1 of the present invention includes the substrate 2; the metallic thermal expansion promoting layer 19 that is positioned upper than the substrate 2 in the lamination direction; the reading part 3 that includes the reading part expansion heater 9, the MR element 8 and the like; and the recording part 4 that includes the main magnetic pole 10, the waveguide 15, the plasmon generator 16, and the like, and is configured as a part of the slider 25 that flies above the magnetic recording medium 5. As illustrated in FIG. 1, on a back surface 25a of the slider 25, that is, the surface on the side opposite to the ABS, a light source 26 is coupled. The light source 268 is, for example, a laser diode, and includes a pair of electrodes 26a, 26b; P (Positive) type and N (Negative) type claddings 26c, 26d that are sandwiched by the electrodes 26a, 26b; and an active layer 26e that is positioned between the two claddings 26c, 26d, and a cleavage surface has a reflector structure. The light source 26 is fixed to the slider 25 by using an appropriate method. The active layer 26e in which laser light is continuously oscillated is arranged the same straight line as the waveguide 15 of the recording part 4, and the laser light generated in the active layer 26e is incident onto the waveguide 15. The wavelength of the laser light is not particularly limited, and, as an example, is about 800 nm.

Figure 3:
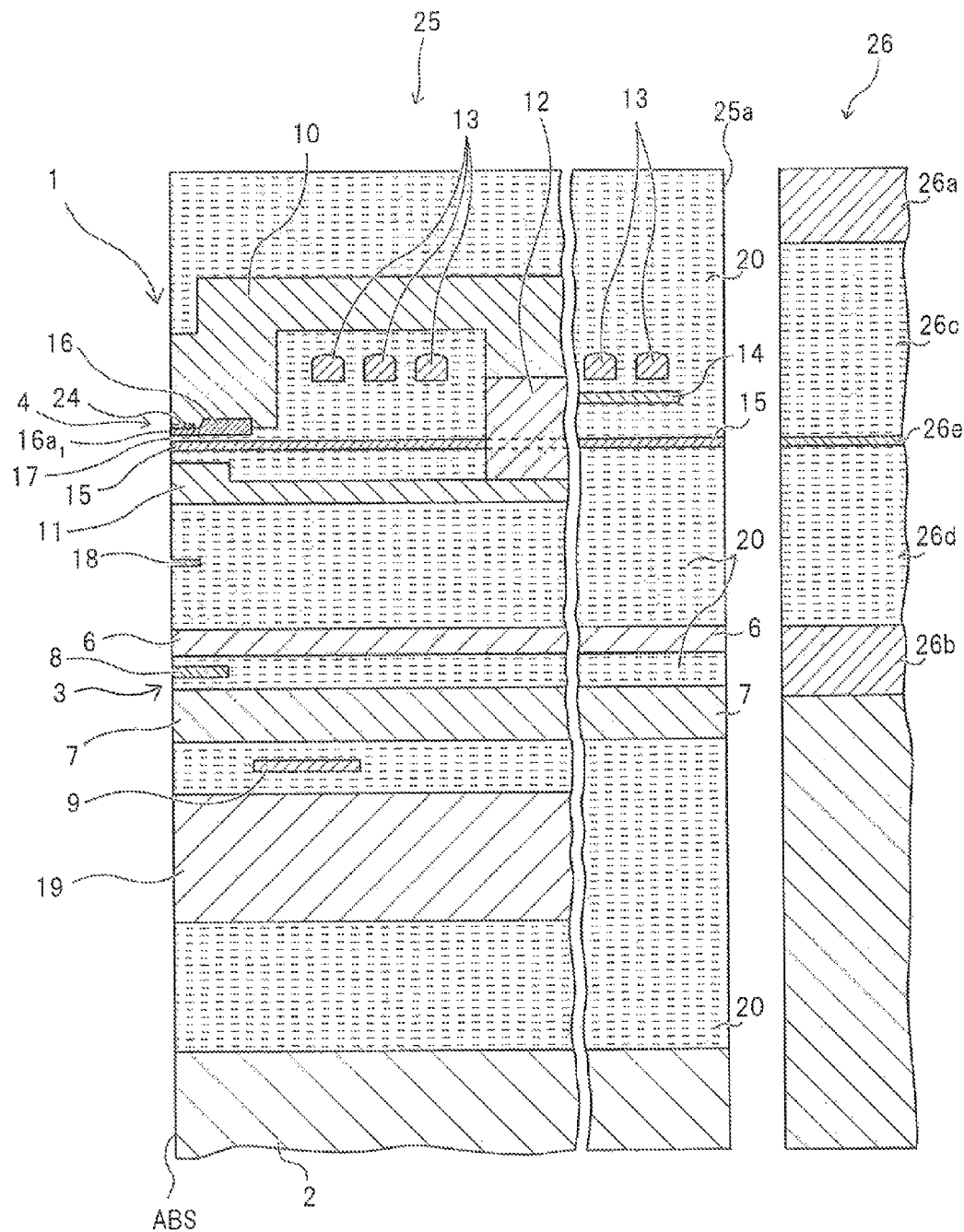
FIG. 3 is a cross-sectional view of a slider containing a modified embodiment of the magnetic head according to the first embodiment of the present invention.

FIG. 3 illustrates a modified embodiment of the magnetic head 1. As compared to the configuration illustrated in FIG. 1, in this magnetic head 1, the leading shield layer 11 of the recording part 4 is close to the waveguide 15, that is, is positioned away from the reading part 3. In this modified embodiment, the nonmagnetic material 20 of a low thermal conductivity that is positioned between the recording part 4 and the reading part 3 is thick. Therefore, a thermal effect on the recording part 4 when the reading part expansion heater 9 is driven and a thermal effect on the reading part 3 when the recording part expansion heater 14 is driven can be kept small.

Figure 4:
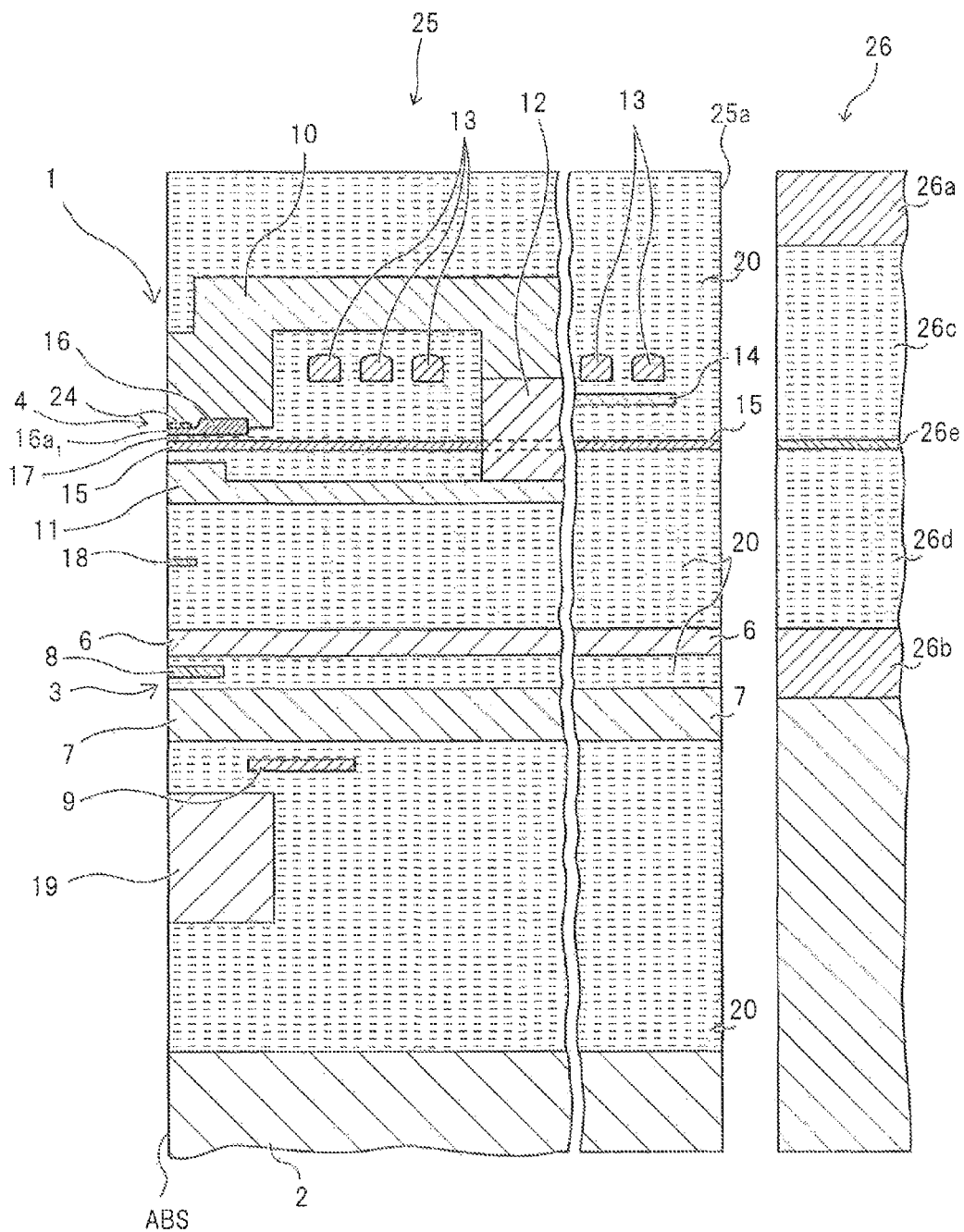
FIG. 4 is a cross-sectional view of a slider containing another modified embodiment of the magnetic head according to the first embodiment of the present invention.

FIG. 4 illustrates another modified embodiment of the magnetic head 1. As compared to the configuration illustrated in FIG. 3, in this magnetic head 1, the length in the depth direction (Y-direction) of the metallic thermal expansion promoting layer 19 is short, and the thermal expansion promoting layer 19 is prepared only in the vicinity of the ABS. Even in this configuration, the protrusion magnitude of the reading part 3 from the ABS due to thermal expansion can be made sufficiently large. Therefore, it is prevented that the recording part 4 becomes in contact with the magnetic recording medium 5 before the reading part 3 becomes in contact with the magnetic recording medium 5 so that the reading part 3 is inhibited from approaching the magnetic recording medium 5, and thus it is avoided that the distance between the reading part 3 and the magnetic recording medium 5 cannot be made sufficiently small so that the reading performance decreases. Further, when setting the flying height of the magnetic head 1 from the magnetic recording medium 5 during reading, it is based on a state in which, not the recording part 4, the reading part 3 itself is in contact with the magnetic recording medium 5, and thus, the setting of the flying height can be accurately performed, and a desired reading performance can be obtained.

Figure 5:
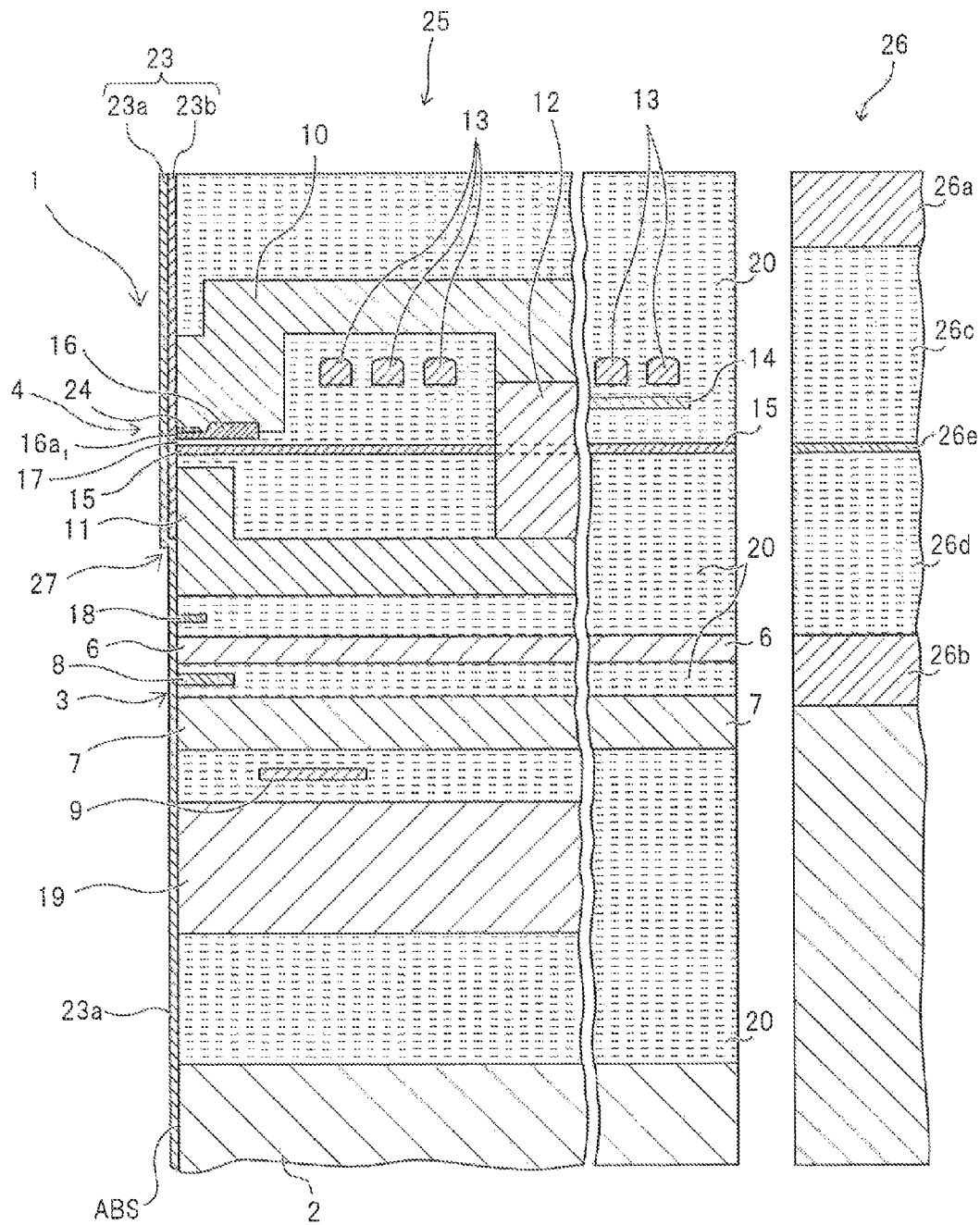
FIG. 5 is a cross-sectional view of a slider containing a magnetic head according to a second embodiment of the present invention.

FIG. 5 illustrates a magnetic head 1 according to another embodiment of the present invention. In this magnetic head 1, a protective layer 23 that covers at least the reading part 3 and the recording part 4 is formed on the ABS. The protective layer 23 is prepared in order to prevent damage of the ABS due to that, when setting the flying height of the magnetic head 1 from the magnetic recording medium 5, at least once the ABS is brought into contact with the magnetic recording medium 5 (or its substitute). Further, when the recording part 4 performs heating by irradiating the magnetic recording medium 5 with the near-field light in order to perform thermally-assisted magnetic recording, temperature rise also occurs in the recording part 4 (in particular, the plasmon generator 16) itself, which may be damaged by the heat. Therefore, in the protective layer 23 of the present embodiment, a portion covering the recording part 4 is a two-layer structure and a portion covering the reading part 3 is a single layer structure. Specifically, the protective layer 23 is configured from a first protective layer 23a and a second protective layer 23b. The first protective layer 23a is formed of a DLC (diamond-like carbon) and the like and covers substantially the entire surface of the ABS to prevent damage due to contact with the magnetic recording medium 5. The second protective layer 23b is formed of $TaO_x$ and the like having a high thermostability and covers only the recording part 4 to prevent damage due to heat. As a result, the portion of the protective layer 23 that covers the reading part 3 (the portion having the single layer structure) and the portion of the protective layer 23 that covers the recording part 4 (the portion having the multilayer structure) have different thicknesses; the portion that covers the reading part 3 protrudes more than the portion that covers the recording part 4 in the depth direction (Y-direction) toward the magnetic recording medium 5. A step 27 exists at a boundary between the portion of the protective layer 23 that covers the reading part 3 and the portion of the protective layer 23 that covers the recording part 4.

As described above, in the magnetic head 1, as compared to the distance between the recording part 4 and the magnetic recording medium 5 during recording, the distance between the reading part 3 and the magnetic recording medium 5 during reading is important. For reliable reading during reading, it is preferable that the reading part 3 and the magnetic recording medium 5 be as close to each other as possible. In a configuration that does not have the thermal expansion promoting layer 19, when the protective layer 23 has a partial multilayer structure, since the portion of the protective layer 23 that covers the recording part 4 is thick, the recording part 4 becomes in contact with the magnetic recording medium 5 before the reading part 3 becomes in contact with the magnetic recording medium 5 and thus the reading part 3 is inhibited from approaching the magnetic recording medium 5. Suppose the entire protective layer 23 has a multilayer structure, although there is no partial thickness difference and a step does not exist, since the reading part 3 is away from the magnetic recording medium 5 due to the thickness of the protective layer, the problem is not fundamentally solved.

In contrast, in the present invention, as described above, the metallic thermal expansion promoting layer 19 is prepared between the reading part 3 and the substrate 2, more specifically, between the reading part expansion heater 9 and the substrate 2, so that the reading part 3 has a larger protrusion magnitude in the Y-direction during thermal expansion as compared to the recording part 4 (the DFH gamma ratio is 1.5 or more). Therefore, the partial thickness difference in the protective layer 23 is overcome, and it is possible that, when the reading part expansion heater 9 is driven, the reading part 3 is closer to the magnetic recording medium 5 than the recording part 4 is. For example, it is prevented that, when setting the flying height, the recording part 4 becomes in contact with the magnetic recording medium 5 before the reading part 3 becomes in contact with magnetic recording medium 5. Thereby, a desired small distance between the reading part 3 and the magnetic recording medium 5 during reading can be accurately set, and a highly reliable good reading performance can be achieved.

Figure 6A:
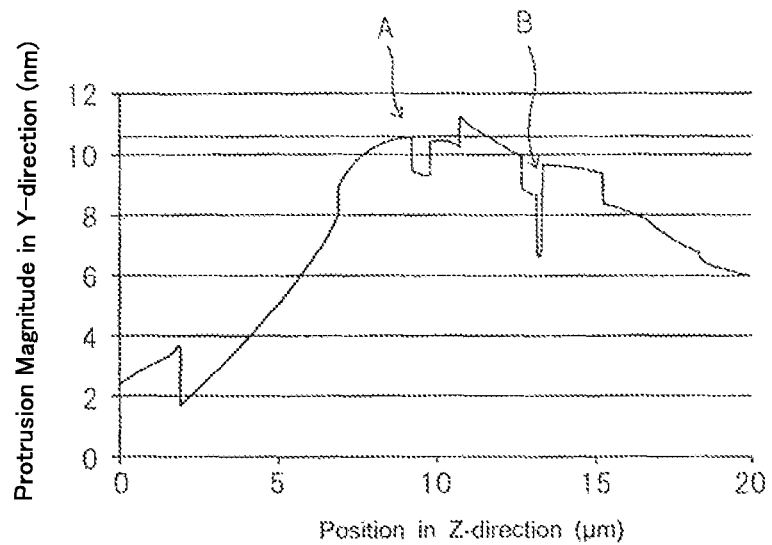
FIG. 6A is a graph illustrating a relation between a position along a Z-direction of an ABS of a magnetic head and a protrusion magnitude (or length of protrusion) in a Y-direction in a case where a ratio between lengths of protrusion in the Y-direction of a reading part and a recording part during heating by a reading part expansion heater is 1.22, in the magnetic head according to the second embodiment of the present invention.
Figure 6B:
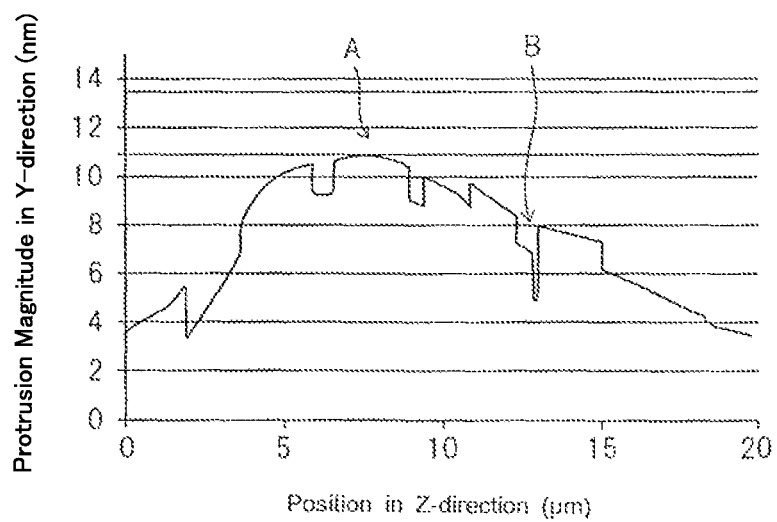
FIG. 6B is a graph illustrating a relation between a position along the Z-direction of the ABS of the magnetic head and a protrusion magnitude in the Y-direction in a case where a ratio between lengths of protrusion in the Y-direction of the reading part and the recording part during heating by the reading part expansion heater is 1.53, in the magnetic head according to the second embodiment of the present invention.

Effects of the present embodiment are explained in more detail. FIGS. 6A and 6B illustrate relations between a position along the lamination direction (Z-direction) of the ABS of the magnetic head 1 and a protrusion magnitude in the direction toward the magnetic recording medium 5, which is the depth direction (Y-direction), during heating by the reading part expansion heater 9. On a horizontal axis in FIGS. 6A and 6B, a position in the Z-direction is represented as a distance from a certain reference position. FIG. 6A illustrates simulation results of a case where a ratio (DFH gamma ratio) between lengths of protrusion of the reading part 3 and the recording part 4 in the Y-direction during thermal expansion is 1.22, which is small. FIG. 6B illustrates simulation results of a case where the ratio (DFH gamma ratio) between the lengths of protrusion of the reading part 3 and the recording part 4 in the Y-direction during thermal expansion is 1.53, which is large. From FIG. 6A, it is clear that, in the case where the ratio (DFH gamma ratio) between the lengths of protrusion is small, the vicinity (B portion) of the recording part 4 that is positioned upper in the lamination direction protrudes more in the depth direction and is closer to the magnetic recording medium 5 than the vicinity (A portion) of the reading part 3 that is positioned lower in the lamination direction. In this case, the reading part 3 is restricted from coming close to the magnetic recording medium 5. Further, in the operation of setting the flying height, when the ABS is once brought into contact with the magnetic recording medium (or its substitute), the recording part 4 first becomes in contact with the magnetic recording medium 5 so that the reading part 3 cannot reach the position in contact with the magnetic recording medium 5. Therefore, the distance between the reading part 3 and the magnetic recording medium 5 cannot be accurately set. As a result, reading performance by the reading part 3 is not good. On the other hand, from FIG. 6B it is clear that, in the case where the ratio (DFH gamma ratio) between the lengths of protrusion in the Y-direction during thermal expansion is large, the vicinity (A portion) of the reading part 3 that is positioned lower in the lamination direction protrudes more in the depth direction and is closer to the magnetic recording medium 5 than the vicinity (B portion) of the recording part 4 that is positioned upper in the lamination direction. Therefore, the reading part 3 can be brought further closer to the magnetic recording medium 5. Further, in the operation of setting the flying height, not the recording part 4, the reading part 3 is brought into contact with the magnetic recording medium 5, and based on this state, the distance between the reading part 3 and the magnetic recording medium 5 can be accurately set. Therefore, reading performance by the reading part 3 is good. The data illustrated in FIGS. 6A and 6B are based on an assumption that the difference (step 27) in the partial thicknesses of the protective layer 23 is 1 nm and the distance in the lamination direction (Z-direction) between the reading part 3 and the recording part 4 is 4.2 μm.

Figure 7:
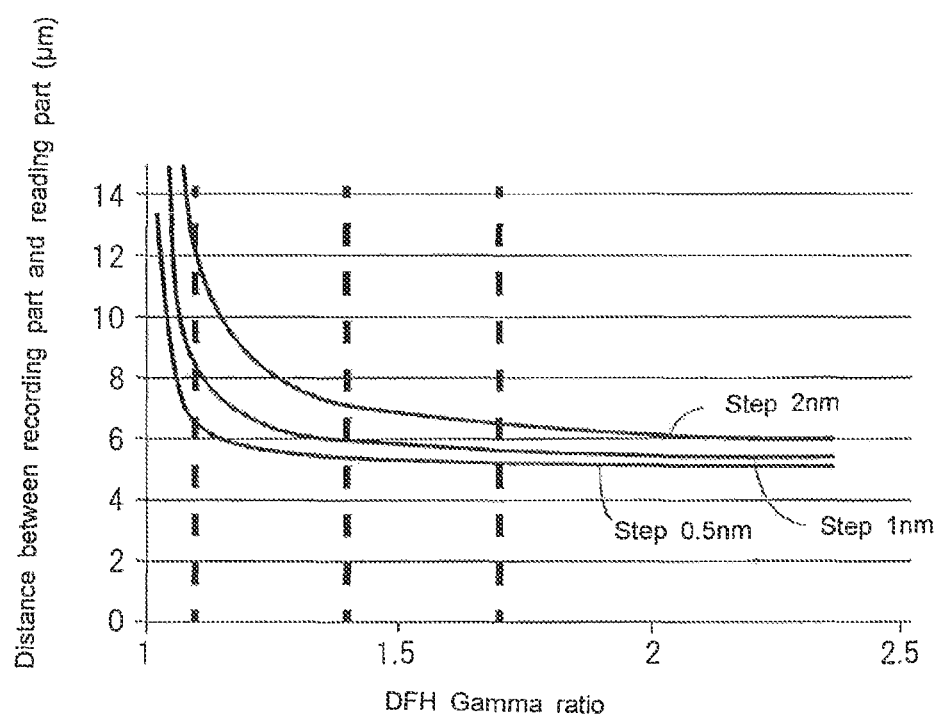
FIG. 7 is a graph illustrating a relation between a DFH gamma ratio in the Y-direction of the reading part and the recording part and a distance between the reading part and the recording part in the Z-direction when the lengths of protrusion in the Y-direction of the reading part and the recording part are equal.

FIG. 7 illustrates simulation results of a relation between the ratio (DFH gamma ratio) between the lengths of protrusion in the Y-direction of the reading part 3 and the recording part 4 during thermal expansion and the distance in the lamination direction (Z-direction) between the reading part 3 and the recording part 4 in the case where the lengths of protrusion in the Y-direction of the reading part 3 and the recording part 4 are equal, for the difference (step 27) in the partial thicknesses of the protective layer 23 being 0.5 nm, 1 nm, and 2 nm. From FIG. 7, it is clear that, even in the case where the step 27 of the protective layer 23 is relatively large (2 nm), when the ratio (DFH gamma ratio) between the lengths of protrusion of the reading part 3 and the recording part 4 is 1.5 or more, the distance in the lamination direction (Z-direction) between the reading part 3 and the recording part 4 is kept at 7 μm or less. Therefore, it is preferable that the DFH gamma ratio be 1.5 or more.

Regarding this point, referring to FIG. 7, when the ratio (DFH gamma ratio) between the lengths of protrusion of the reading part 3 and the recording part 4 is larger than 1.5, it is necessary either to reduce the step 27 of the protective layer 23 or to increase the distance in the lamination direction (Z-direction) between the reading part 3 and the recording part 4 to a value larger than 7 μm. There is a possibility that, depending on the thermostability of the material that configures the plasmon generator 16 and the intensity of the laser light supplied to the waveguide 15, the step 27 of the protective layer 23 cannot be too small. Further, when the distance in the lamination direction (Z-direction) between the reading part 3 and the recording part 4 is increased, in particular, in a case where the magnetic head 1 is skewed with respect to the surface of the magnetic recording medium 5 (a case where a skew angle exists), a distance between a position opposing the reading part 3 and a position opposing the recording part 4 on the surface of the magnetic recording medium 5 increases. A track of the magnetic recording medium 5 that is located within this distance cannot be used for magnetic recording, and thus the recording capacity is reduced. Therefore, it is not preferable that the distance in the lamination direction (Z-direction) between the reading part 3 and the recording part 4 is large. From the graph of FIG. 7, it can be seen that conditions that allow the DFH gamma ratio to be relatively increased while allowing the distance between the reading part 3 and the recording part 4 to be relatively reduced are that the distance in the lamination direction (Z-direction) between the reading part 3 and the recording part 4 is 7 μm or less, that the step 27 of the protective layer 23 is 2 nm or less, and that the DFH gamma ratio is 1.5 or more.

In the present embodiment, the protective layer 23 of a two-layer structure is formed on the ABS. However, a configuration having a protective layer of a single layer structure is also possible. In this case, the protective layer 23 may be a partial protective layer that is prepared on a portion that mainly covers the recording part 4, and may also be a protective layer that covers the entire ABS.

Figure 8:
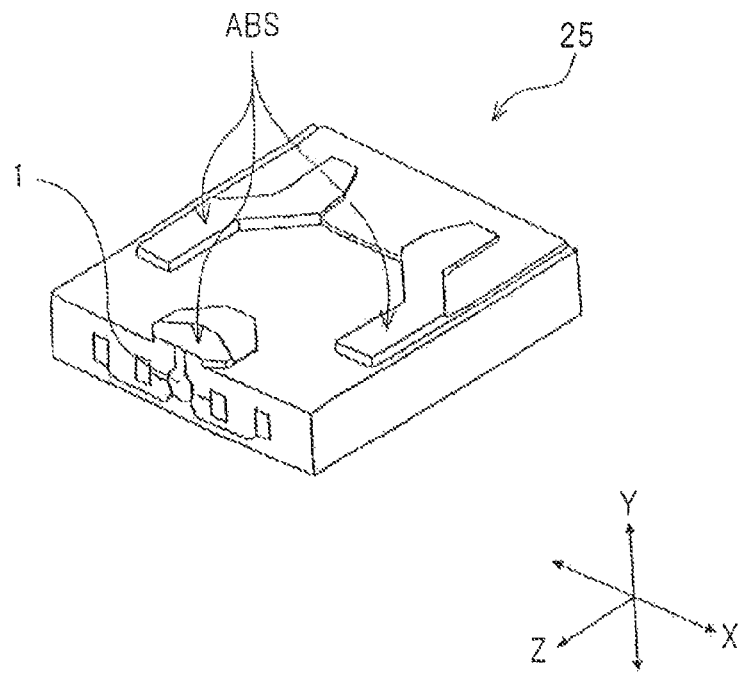
FIG. 8 is a perspective view of the slider illustrated in FIG. 1.
Figure 9:
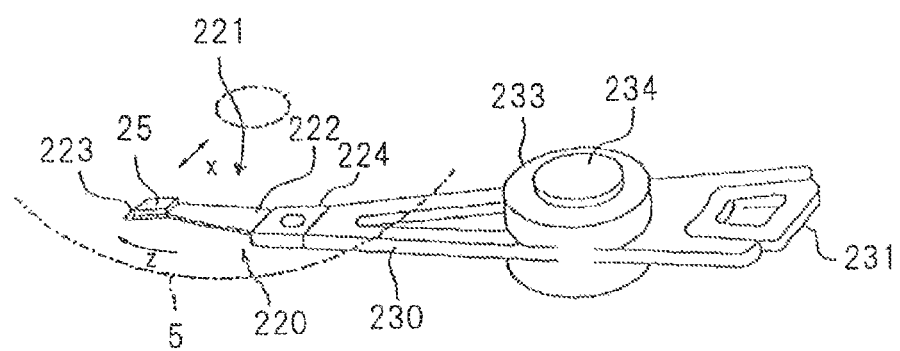
FIG. 9 is a perspective view of a head gimbal assembly containing the slider illustrated in FIG. 1.

FIG. 8 is a perspective view of the slider 25 containing the magnetic head 1 of the present invention. The slider 25 has a nearly hexahedral shape, and one of the six surfaces is the ABS that opposes the magnetic recording medium 5. As illustrated in FIG. 9, a head gimbal assembly 220 is provided with the slider 25 and a suspension 221 that elastically supports the slider 25. The suspension 221 includes a load beam 222 that is formed of stainless steel and has a shape of a plate spring, a flexure 223 that is provided on one end part of the load beam 222, and a base plate 224 that is provided on the other end part of the load beam 222. The slider 25 is bonded to the flexure 223, and an appropriate degree of freedom is provided to the slider 25. A gimbal part is provided for keeping a posture of the slider 25 constant on a portion of the flexure 223 on which the slider 25 is mounted.

The slider 25 is arranged inside a hard disk drive apparatus in a manner opposing the magnetic recording medium (hard disk) 5 of a discotic shape that is rotatably driven. When the magnetic recording medium 5 rotates, air flow passing between the magnetic recording medium 5 and the slider 2 generates a lifting force on the slider 25 downward in the Y-direction. The slider 25 flies from the surface of the magnetic recording medium 5 due to the lifting force. The flying height can be finely adjusted using the thermal expansion of the slider 25 due to the heat generation of the above-described reading part expansion heater 9 and recording part expansion heater 14. The magnetic head 1 is formed in the vicinity of an end part on an air outflow side of the slider 25 (end part on the lower left side in FIG. 8).

An assembly in which the head gimbal assembly 220 is mounted on an arm 230 is referred to as a head arm assembly. The arm 230 moves the slider 25 in the track crossing direction (X-direction) of the magnetic recording medium 5. One end of the arm 230 is mounted on the base plate 224. On the other end part of the arm 230, a coil 231 that forms a part of a voice coil motor is mounted. A bearing part 233 is provided in a middle portion of the arm 230. The arm 230 is rotatably supported by a shaft 234 mounted on the bearing part 233, The arm 230 and the voice coil motor that drives the arm 230 configure an actuator.

Figure 10:
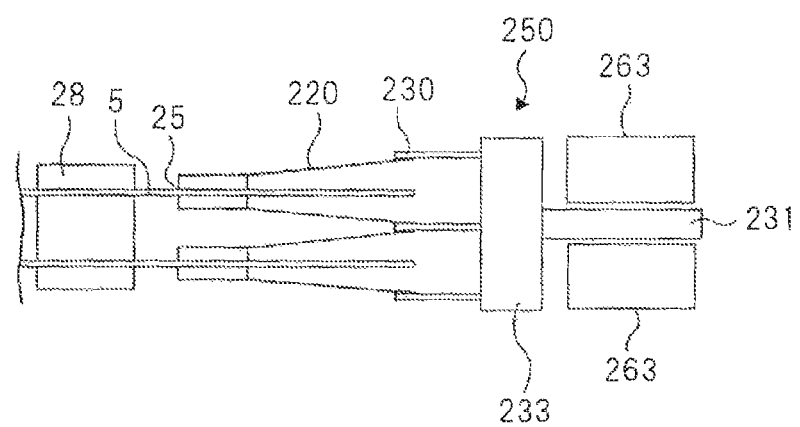
FIG. 10 is a side view of a main part of a hard disk drive apparatus containing the head gimbal assembly illustrated in FIG. 9.
Figure 11:
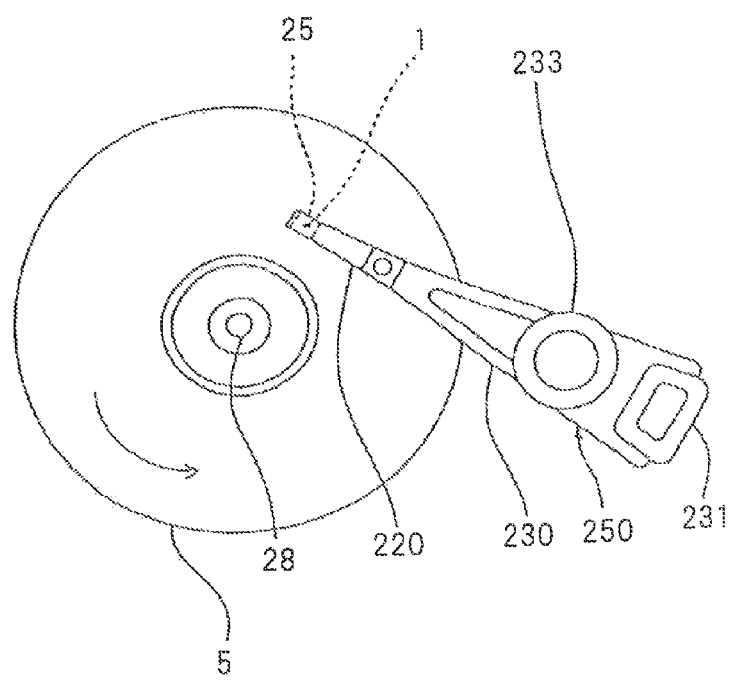
FIG. 11 is a plan view of the hard disk drive apparatus containing the head gimbal assembly illustrated in FIG. 9.

Next, a head stack assembly in which the above-described slider 25 is incorporated and a hard disk drive apparatus are explained. The head stack assembly is an assembly in which the head gimbal assembly 220 is mounted on each arm of a carriage that has a plurality of arms. FIG. 10 is a side view of the head stack assembly and FIG. 11 is a plan view of the hard disk drive apparatus. The head stack assembly 250 has a carriage that has a plurality of arms 230. The carriage configures the above-described bearing part 233. The head gimbal assemblies 220 are mounted on the arms 230 in a manner to align themselves in the perpendicular direction at intervals from each other. On an opposite side of the arm 230 of the carriage, the coil 231 that forms a part of the voice coil motor is mounted. The voice coil motor has permanent magnets 263 arranged at positions opposing each other across the coil 231.

Referring to FIG. 10, the head stack assembly 250 is incorporated into the hard disk drive apparatus. The hard disk drive apparatus has a plurality of magnetic recording medium 5 mounted to a spindle motor 28 that is a rotary holding mechanism. For each magnetic recording medium 5, two sliders 25 are arranged in a manner opposing each other across the magnetic recording medium 5. The head stack assembly 250 and actuator, excluding the sliders 25, correspond to the device, support the sliders 25 and position the sliders 25 with respect to the magnetic recording medium 5. The sliders 25 are moved by the actuator in the track crossing direction (X-direction) of the magnetic recording medium 5 and are positioned with respect to the magnetic recording medium 5. The recording part 4 of the magnetic head 1 in a thin film form that is contained in the slider 25 records magnetic information to the magnetic recording medium 5, and the MR element 8 of the reading part 3 reads the magnetic information recorded in the magnetic recording medium 5.

The desirable embodiments of the present invention are presented and explained in detail. However, these explanations are exemplary. It should be understood that various changes and modifications are possible without departing from the spirit or scope of the appended claims.

What is claimed is:

1. A magnetic head comprising:
   a reading part that is prepared upper than a substrate in a lamination direction and has a reading element that performs reading of information recorded in a magnetic recording medium;
   a recording part that is prepared upper than the substrate in the lamination direction and performs magnetic recording to the magnetic recording medium;
   a recording part expansion heater that is positioned in a vicinity of the recording part;
   a reading part expansion heater that is positioned in a vicinity of the reading part; and
   a thermal expansion promoting layer that is prepared at a position closer to the reading part than to the recording part and extends to an air bearing surface that opposes the magnetic recording medium,
   wherein the recording part comprises:
      a waveguide that propagates incident light toward the air bearing surface;
      a main magnetic pole of which one end part is positioned on the air bearing surface; and
      a plasmon generator that is positioned between the waveguide and the main magnetic pole, that is prepared along the waveguide in a manner opposing the waveguide, and of which one end part is positioned on the air bearing surface, and
   the recording part is a thermally-assisted magnetic recording part that performs magnetic recording to the magnetic recording medium while heating the magnetic recording medium by irradiating the magnetic recording medium with light.

2. The magnetic head according to claim 1, wherein
   the recording part is prepared upper than the reading part in the lamination direction, and
   the thermal expansion promoting layer is positioned between the substrate and the reading part.

3. The magnetic head according to claim 1, wherein
   the recording part expansion heater and the reading part expansion heater are driven independently of one another.

4. The magnetic head according to claim 2, wherein
   the reading part comprises:
      the reading element; and an upper shield layer and a lower shield layer that are arranged in a manner sandwiching the reading element, and the thermal expansion promoting layer is positioned between the substrate and the lower shield layer.

5. The magnetic head according to claim 4, wherein the reading part expansion heater is prepared between the lower shield layer of the reading part and the thermal expansion promoting layer.

6. The magnetic head according to claim 5, wherein a distance between the lower shield layer and the thermal expansion promoting layer is 0.5-1.0 μm.

7. The magnetic head according to claim 1 further comprising a protective layer covering the air bearing surface, wherein a portion of the protective layer that covers the recording part has a thickness larger than a thickness of a portion of the protective layer that covers the reading part.

8. The magnetic head according to claim 7, wherein a difference between the thickness of the portion of the protective layer that covers the recording part and the thickness of the portion of the protective layer that covers the reading part is 2 nm or less.

9. The magnetic head according to claim 7, wherein the portion of the protective layer that covers the recording part has a multilayer structure, and the portion of the protective layer that covers the reading part has a single layer structure.

10. The magnetic head according to claim 1, wherein a ratio of a protrusion magnitude that the reading part thermally expands and protrudes in a direction orthogonal to the air bearing surface due to heat during driving of the reading part expansion heater to a protrusion magnitude that the recording part thermally expands and protrudes in the direction orthogonal to the air bearing surface due to heat during driving of the recording part expansion heater is 1.5 or more.

11. The magnetic head according to claim 1, wherein a distance between the reading part and the recording part on the air bearing surface is 7 μm or less.

* * * * *